United States Patent
Huang et al.

(10) Patent No.: US 6,880,976 B2
(45) Date of Patent: Apr. 19, 2005

(54) HYDRODYNAMIC AND HYDROSTATIC HYBRID BEARING AND ITS MANUFACTURING METHOD

(75) Inventors: Ching-Hsing Huang, Taipei (TW); Hung-Kuang Hsu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 82 days.

(21) Appl. No.: 10/014,471

(22) Filed: Dec. 14, 2001

(65) Prior Publication Data

US 2003/0039415 A1 Feb. 27, 2003

(30) Foreign Application Priority Data

Aug. 21, 2001 (TW) ........................................ 90120449 A

(51) Int. Cl.[7] ............................................. F16C 32/06
(52) U.S. Cl. ..................... 384/100; 384/114; 384/120
(58) Field of Search ................................. 384/112, 120, 384/100, 114, 118, 119, 279, 902

(56) References Cited

U.S. PATENT DOCUMENTS

| | | | | |
|---|---|---|---|---|
| 2,249,843 A | * | 7/1941 | Marsland | 384/292 |
| 3,759,588 A | * | 9/1973 | Anderson | 384/101 |
| 3,841,720 A | * | 10/1974 | Kovach et al. | 384/123 |
| 4,460,284 A | * | 7/1984 | Lauterbach et al. | 384/126 |
| 4,597,676 A | * | 7/1986 | Vohr et al. | 384/114 |
| 4,671,677 A | * | 6/1987 | Heshmat et al. | 384/124 |
| 4,805,972 A | * | 2/1989 | Tanaka et al. | 359/200 |
| 4,834,559 A | * | 5/1989 | Kalvoda | 384/118 |
| 4,927,274 A | * | 5/1990 | Smith | 384/101 |
| 5,000,584 A | * | 3/1991 | Simmons | 384/118 |
| 5,052,823 A | * | 10/1991 | Adolfsson et al. | 384/133 |
| 5,397,184 A | * | 3/1995 | Murai | 384/110 |
| 5,415,476 A | * | 5/1995 | Onishi | 384/114 |
| 5,466,071 A | * | 11/1995 | Slocum | 384/118 |
| 5,503,478 A | * | 4/1996 | Blaine | 384/100 |
| 5,516,212 A | * | 5/1996 | Titcomb | 384/107 |
| 5,540,504 A | * | 7/1996 | Cordova et al. | 384/100 |
| 5,545,014 A | * | 8/1996 | Sundberg et al. | 417/204 |
| 5,634,724 A | * | 6/1997 | Zang et al. | 384/107 |
| 5,871,285 A | * | 2/1999 | Wasson | 384/118 |
| 6,023,114 A | * | 2/2000 | Mori et al. | 310/90 |
| 6,071,014 A | * | 6/2000 | Lee et al. | 384/107 |
| 6,086,257 A | * | 7/2000 | Lee | 384/279 |
| 6,097,121 A | * | 8/2000 | Oku | 310/91 |
| 6,241,392 B1 | * | 6/2001 | Desai et al. | 384/100 |
| 6,250,807 B1 | * | 6/2001 | Mori et al. | 384/100 |

* cited by examiner

Primary Examiner—William C. Joyce
Assistant Examiner—Julie K. Smith
(74) Attorney, Agent, or Firm—Birch, Stewart, Kolasch & Birch, LLP

(57) ABSTRACT

A hybrid type hydrodynamic and hydrostatic bearing and its manufacturing method are disclosed by the invention. By making use of a penetrated dynamic pressure generating groove carved on the surface of the bushing inside the housing, the processing efficiency of the tiny grooves can be substantially improved. Also, after combining the housing with the bushing, and utilizing porous material that is able to preserve a lubricant, the pressurization by gas can be added externally on the surface of the porous material. After being sealed, the gas prepress can force the lubricant to fill the interval between the bushing and shaft. The bearing can achieve the effect of lubricating and supporting the shaft.

19 Claims, 9 Drawing Sheets

# HYDRODYNAMIC AND HYDROSTATIC HYBRID BEARING AND ITS MANUFACTURING METHOD

BACKGROUND OF THE INVENTION

1. Field of the Invention

The invention relates to a kind of hydro bearing and its manufacturing method. It is applied to small-scale spindle motors. In particular, it has the effect of a hydrodynamic and hydrostatic hybrid type, and it is easy to process the hydrodynamic and hydrostatic hybrid bearing and its manufacturing method.

2. Related Art

A bearing is a kind of device that is applied on rotating machine parts, and is utilized for support, to decrease friction and to accept a load. It can be used, for example, in a spindle motor. The demand for bearing precision is increasing. Generally speaking, the bearing for which the most precision required is the ball bearing. However, this kind of bearing has some problems, such as noise, NRRO (Non-Repeatable Run Out) and high cost of miniaturization, and it would be unable to meet the demands of miniaturization and precision. In order to meet these demands, and to further reduce rotating friction, a hydro bearing with high precision in the future, low noise and strong anti-shock capability has been developed.

Generally speaking, there are two types of bearings: the hydrostatic hearing and hydrodynamic bearing. The hydrostatic bearing is normally a bearing with a hydro lubricant. When the motor rotates, it utilizes hydro pressure to support its shaft. If its shaft deviates, pressure should be added from the deviated side to make the shaft return to the correct position. However, since hydrostatic bearings usually contain a lot of lubricant, they are not suitable for small rotating machine parts that require high precision.

On the other hand, the hydrodynamic bearing is a bearing with tiny grooves located at the bearing's inner aperture. Within the grooves there is a lubricant (since the grooves are tiny, the quantity of lubricant is quite limited). When the shaft rotates, the lubricant inside the grooves is drawn and builds up hydrodynamic pressure to support the shaft at a centered position. However, since it is hydrodynamic, friction occurs when the shaft starts to rotate and pressure has not yet been built up. It is also very difficult to process the inner aperture inside the bearing, and difficult to control the processing precision (the grooves width is usually 100 $\mu$m, and the grooves' depth are even smaller) Moreover, there are problems with the lubricant seal and lubricant filling.

Aimed at these problems with hydrodynamic bearings, many different solutions have been suggested in previous cases, especially regarding processing methods for the tiny grooves in the bearing's inner aperture. For example, there are cutting processing, balling processing, plastic ejection, corrosion, combination and processing after cladding. However, whichever way is used for inner aperture processing, it is difficult to increase the precision and difficult to process, and problems relating to starting friction, lubricant seal and lubricant filling cannot be solved. Hence, the application of bearings on the small active motors, like CD-ROMs and hard discs, has always been restricted.

SUMMARY OF THE INVENTION

The object of the invention is to solve the problems mentioned above. It provides a kind of hydrodynamic and hydrostatic hybrid bearing and its manufacturing method. It is easy to process the inner aperture of the bearing, and also provides hydrodynamic and hydrostatic hybrid effects.

According to the invention, the hydrodynamic and hydrostatic hybrid bearing contains a housing, a bushing, and an shaft. Inside the housing there is porous material that contains a lubricant. The bushing is installed in the inner side of the housing, and has a penetrated dynamic pressure generating groove. Since it is penetrated, it is easy to process. Furthermore, since the housing is sealed after being pre-pressurized, the lubricant can pass through the dynamic pressure generating groove on the bushing, and can be preserved between the bushing and the shaft. So, it can support hydrostatic pressure without starting friction. When the shaft rotates, the lubricant will build up hydrodynamic pressure to support it. Because the lubricant is added from the porous material of the housing, pressurized and lubricant sealed, it becomes easier to fill and seal the lubricating media.

The manufacturing method of the hydrodynamic and hydrostatic hybrid bearing of the invention involves first forming a bushing, and then forming several dynamic pressure generating grooves on it. The bushing is integrated on the housing with the porous material inside, which contains lubricant. A shaft is installed within the bushing. The housing is pre-pressurized and sealed. Since the bushing is a kind of penetrated dynamic pressure generating groove processed independently, it is very easy to process. Also, because the porous material of the housing contains a lubricant, it is easy to fill and seal lubricant. Moreover, since the housing is pre-pressurized, it can store a suitable amount of lubricating media between the bushing and shaft. Therefore, starting friction can be avoided, and the bearing has both hydrodynamic and hydrostatic effects.

In order to provide a better understanding of the objective, structural characteristics and function of the invention, a detailed description with diagrams will follow.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given herein below. However, the following description is for purposes of illustration only, and thus is not limitative of the invention, wherein.

DETAILED DESCRIPTION OF THE INVENTION

Figure 1:
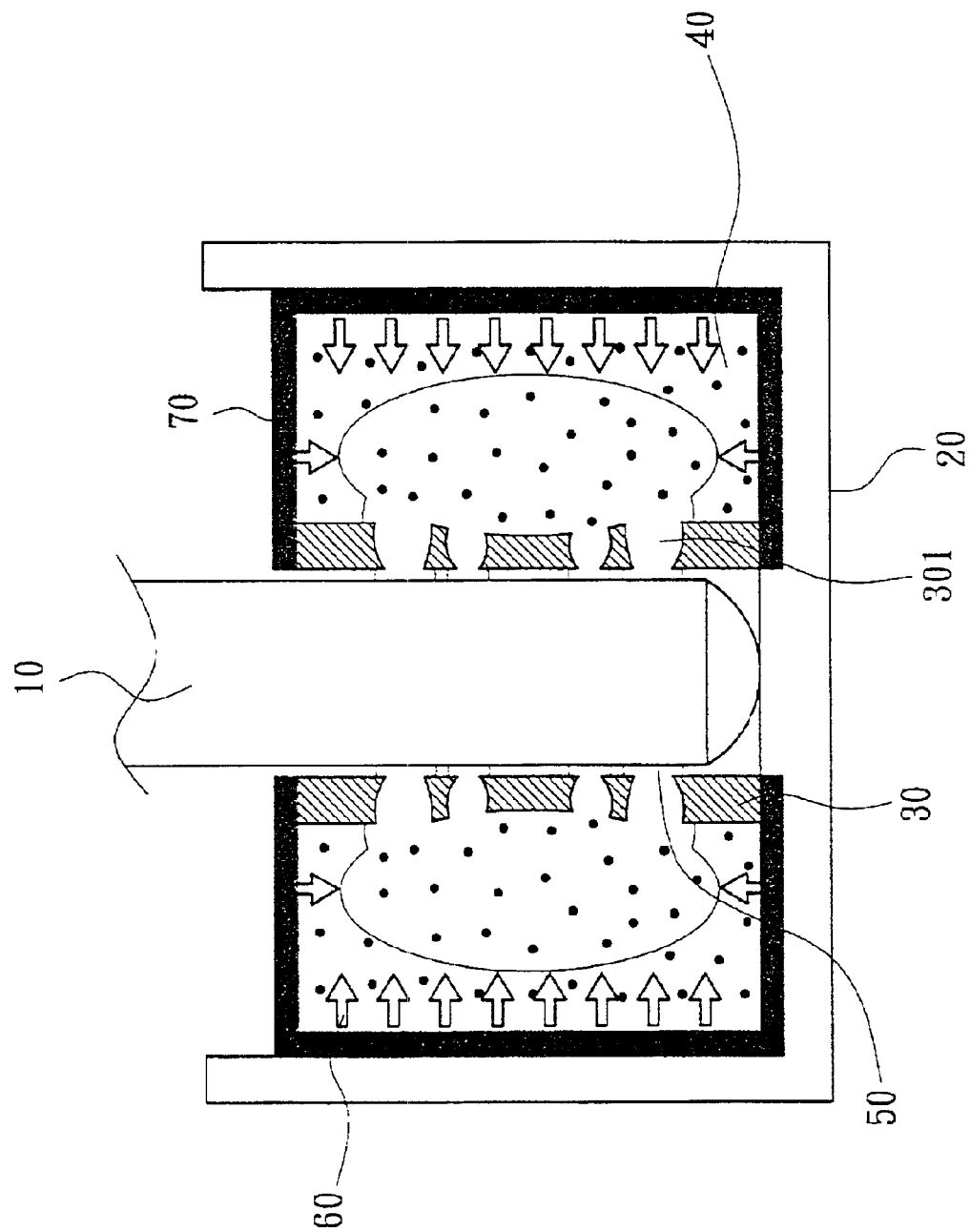
FIG. 1 is a diagram of the invention.

The hydrodynamic and hydrostatic hybrid bearing and its manufacturing method disclosed in the invention (shown in FIG. 1) contain one shaft 10, one housing 20 and one bushing 30. The housing 20 is frame shaped, contains porous material 40, and can preserve the lubricant 50. One side of the housing is sealed with a sealing unit 70, so as to prevent the lubricant from being exposed. In the middle of the porous material 40 there is a space, which can be used to install the bushing 30. The bushing 30 has a cylindrical shape and is used to install the shaft 10. The bushing 30 contains a plurality of penetrated dynamic pressure generating grooves 301 on its surface. Lubricant 50 contained in the porous material 40 can ooze through these dynamic pressure generating grooves 301, to achieve the effects of lubrication and support.

Figure 2:
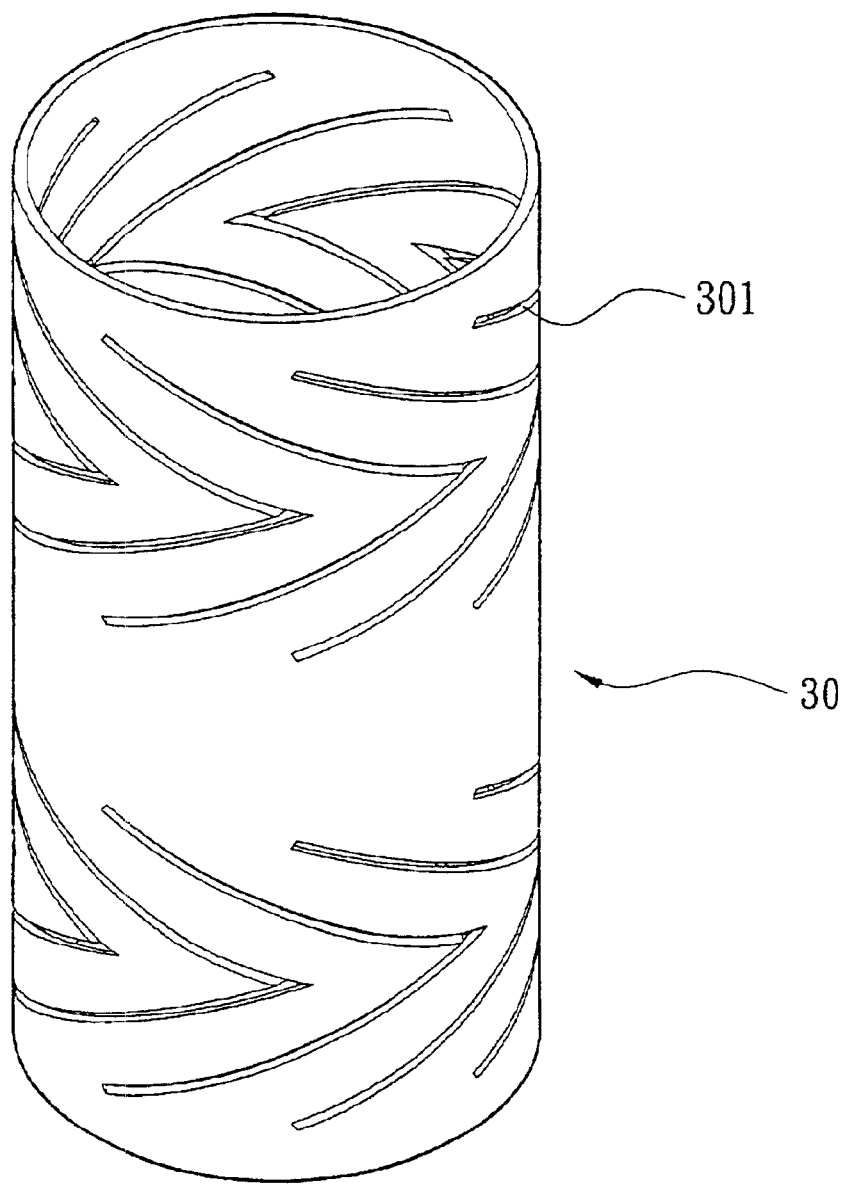
FIG. 2 is a diagram of the bushing of the invention.

In other words, the bushing 30 utilizes a processing method different from the previously discussed well-known inner aperture processing methods. It uses an independent processing means of penetration (see FIG. 2), and then is installed in the housing 20 with porous material 40 inside. In this way, the surface of the inner aperture of the shaft 10 also contains dynamic pressure generating grooves 301. However, since the bushing 30 is processed independently, it makes processing easier. Also, processing methods can be more diverse. They are not restricted by the tiny size of the inner aperture, and the shape and precision of the dynamic pressure generating grooves 301 are not confined. As shown in FIG. 2, the dynamic pressure generating grooves 301 are herringbone when it rotates opposite to the inner shaft 10. The lubricant on both sides of the dynamic pressure generating grooves 301 is led to be concentrated in the middle and produces hydrodynamic pressure, which supports the shaft 10 in the middle of the bushing 30. While a V-shape is shown for example, the groove is not restricted to this shape. Any shape that can serve to build up hydrodynamic pressure while rotating is suitable. Furthermore, since the bushing is processed independently, the shape of the dynamic pressure generating groove 301 can be more diversified.

Figure 3:
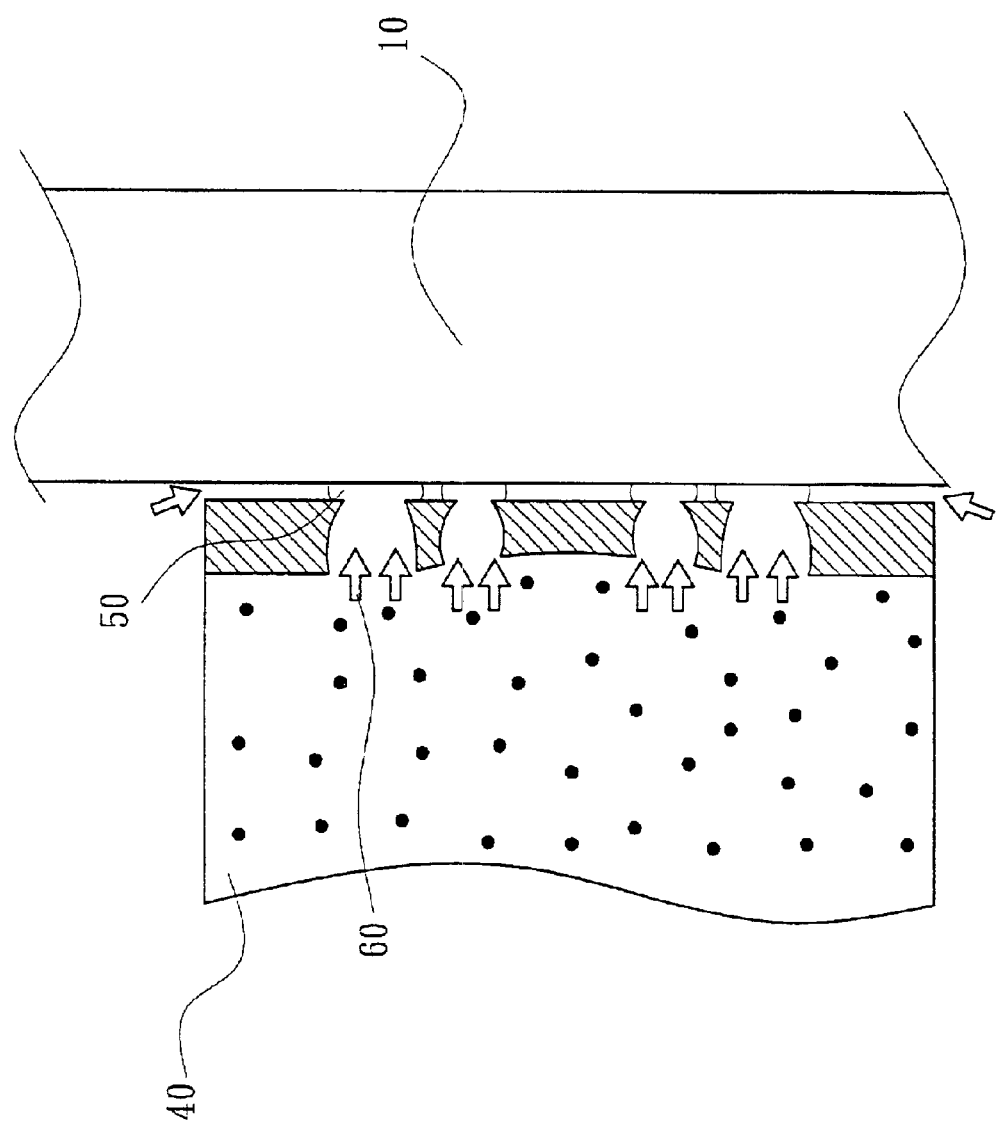
FIG. 3 is a chart illustrating the static effect of the invention.

The porous material 40 inside the housing 30 contains a lubricant 50 (for example, lubricating lubricant). The porous material 40 should be pre-pressurized before sealing, and then sealed by a sealing unit 70 (for example, sealing glue and sealing cover, etc.) to prevent the lubricant from spilling out. Since pre-pressure 60 is added, the lubricant 50 flows out from the dynamic pressure generating grooves 301 of the bushing 30. It is kept between the bushing 30 and the shaft 10 (because of the equilibrium between sticky force and atmospheric pressure), as shown in FIG. 3. As mentioned above, since the dynamic pressure generating grooves 301 are very tiny, just like a capillary, the lubricant can be kept between the bushing 30 and the shaft 10. Also, the amount of lubricant 50 can be adjusted to an optimum level by controlling the magnitude of pre-pressure. In a normal situation, when the shaft has not started moving, it will provide hydrostatic protection to avoid starting friction in the hydrodynamic bearing, and provide hydrodynamic and hydrostatic hybrid effects. On the other hand, since the bearing uses a lubricant 50 contained in the porous material 40, it is easy to fill and seal the lubricant. Moreover, the porous material 40 provides lubricating tank functions. When the lubricant 50 between the bushing 30 and the shaft 10 spills out, it presses the lubricant 50 out by pre-pressure 60, to re-supply the amount of lubricant 50 between the bushing 30 and the shaft 10.

Figure 4:
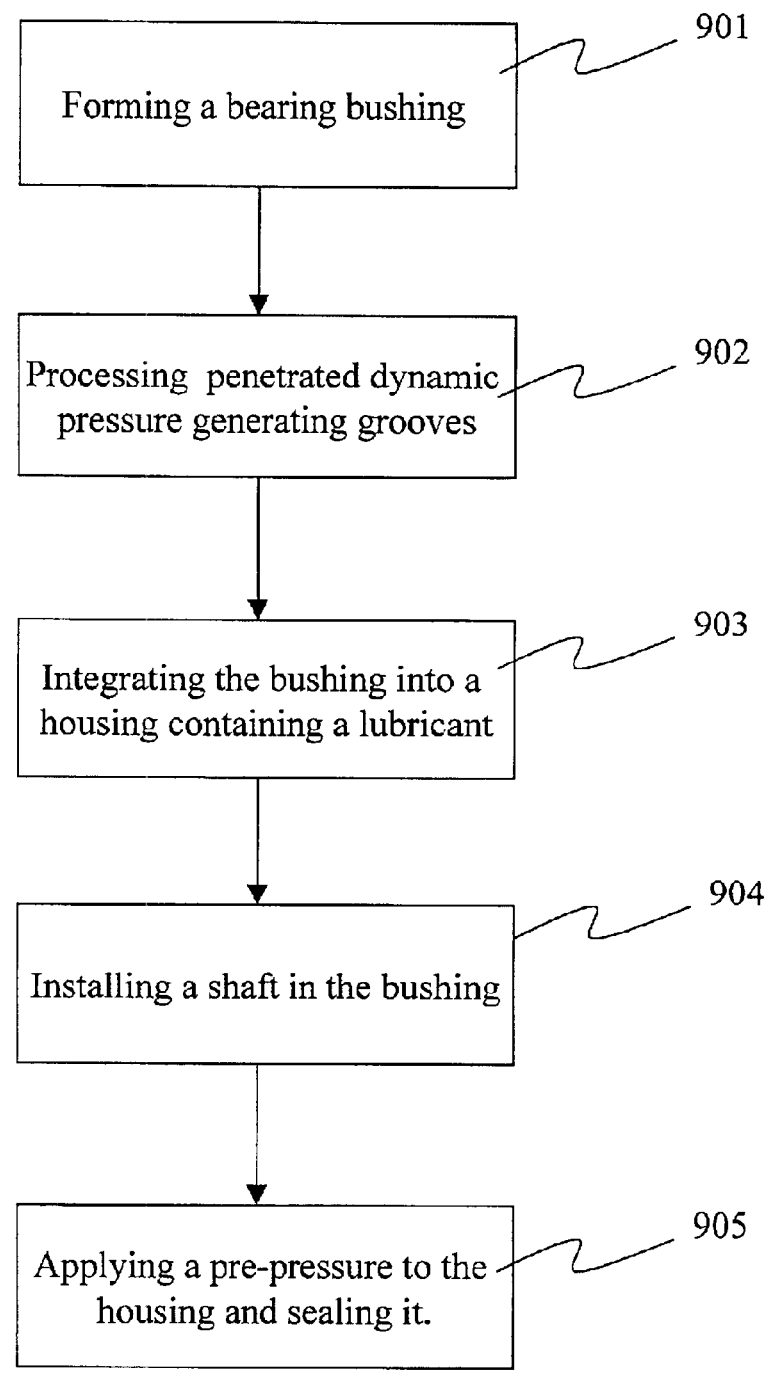
FIG. 4 is a flow chart of the invention.
Figure 5B:
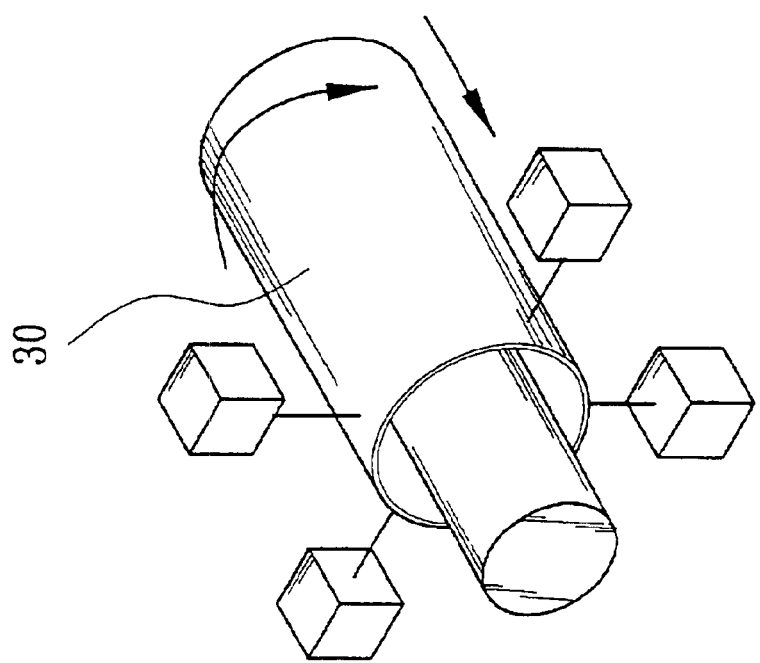
FIGS. 5A~5G are diagrams of the manufacturing method of the invention.
Figure 5A:
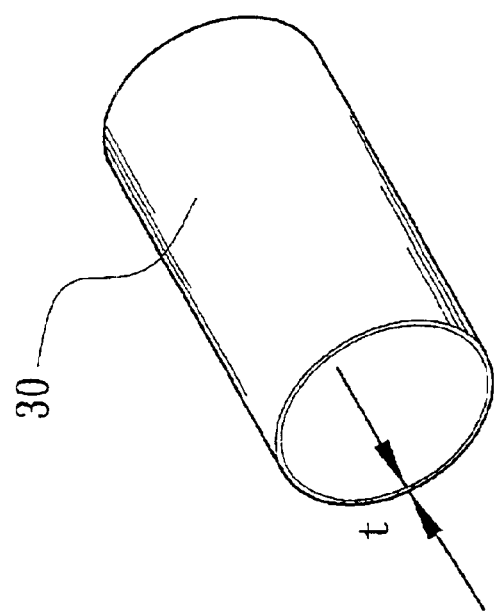
Figure 5D:
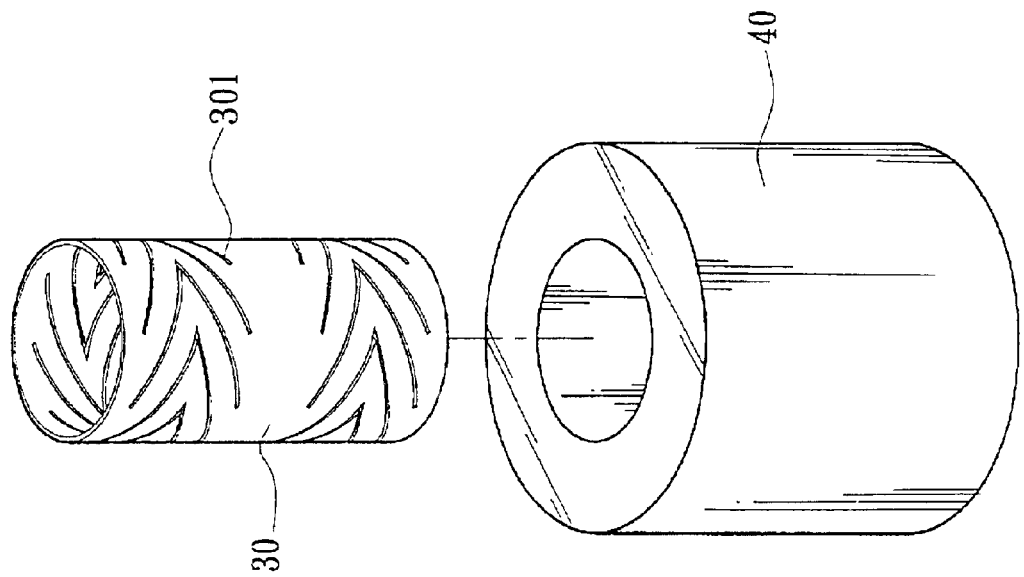
Figure 5C:
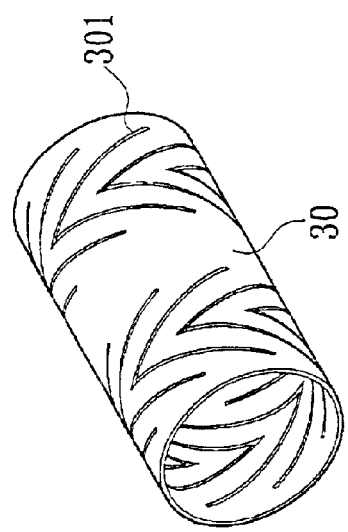

As shown in FIG. 4, in the manufacturing method of the hydrodynamic and hydrostatic hybrid bearing in the invention, the bushing is first formed (step 901). As shown in FIGS. 5A and 5B, a cylinder-shaped bushing 30 with appropriate thickness t is formed, and then several penetrated dynamic pressure generating grooves 301 are processed on the bushing. As mentioned above, there are many kinds of dynamic pressure generating grooves 301, and two groups of herringbone are shown in FIGS. 2 and 5C. A cutter process, etching or plastic injection can be used as a processing method. Since the dynamic pressure generating grooves are formed outside the bushing 30, the processing method is not restricted. Here only two methods are shown (see FIG. 5B). The burr is then eliminated to make it easy to install.

Figure 5E:
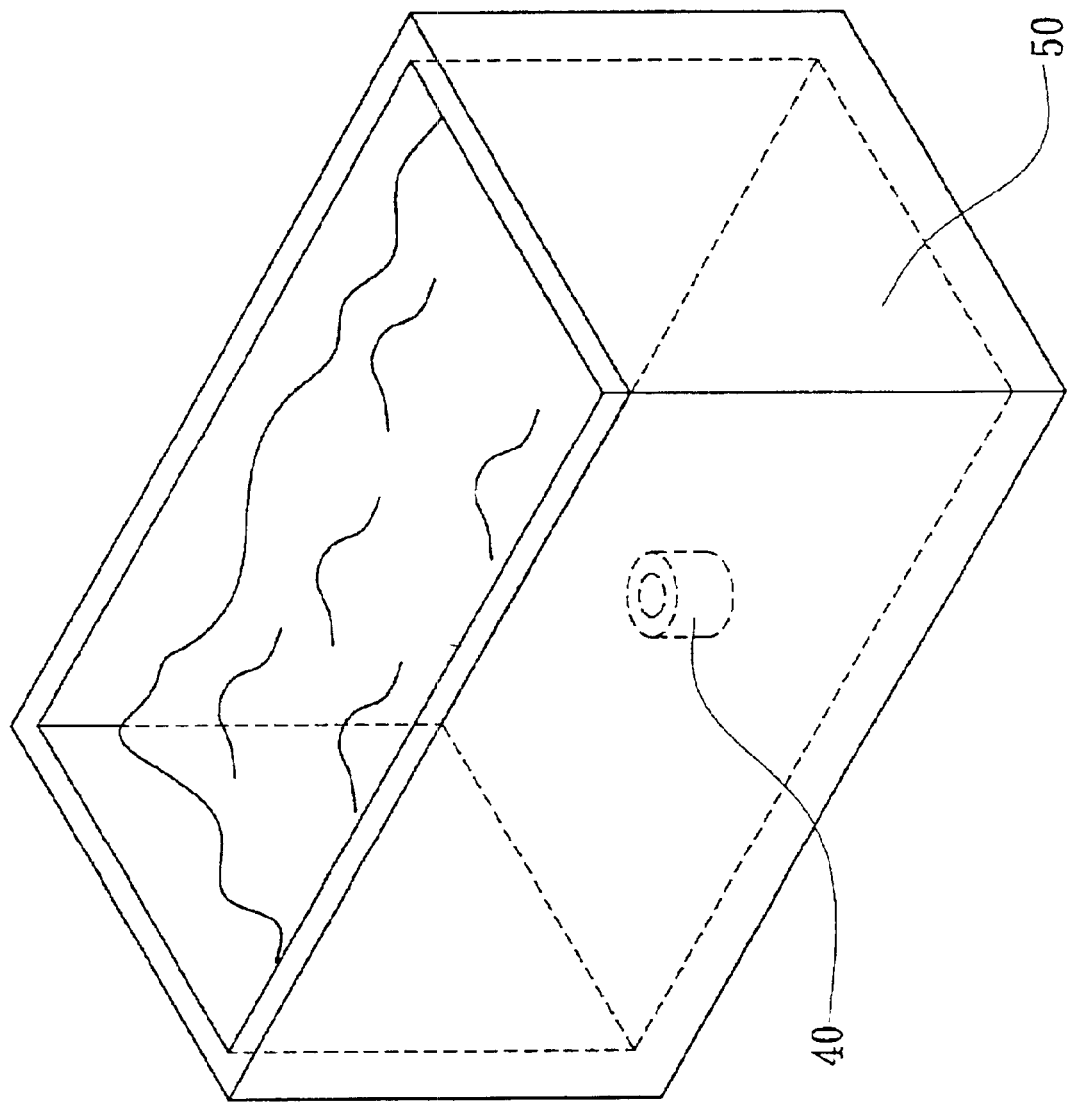

Subsequently, the bushing 30 is integrated with the housing 20. During the manufacturing process, the bushing 30 can be inserted into the porous material 40 (see FIG. 5D)(for example, it can be inserted directly or by extruding and sintering). Afterward, permeating lubricant is proceeded so as to keep lubricant 50 in the porous material 40 (see FIG. 5E). Processing lubricant permeating lubricant is not the only possible method. Material that contains a lubricant can be used instead.

Figure 5F:
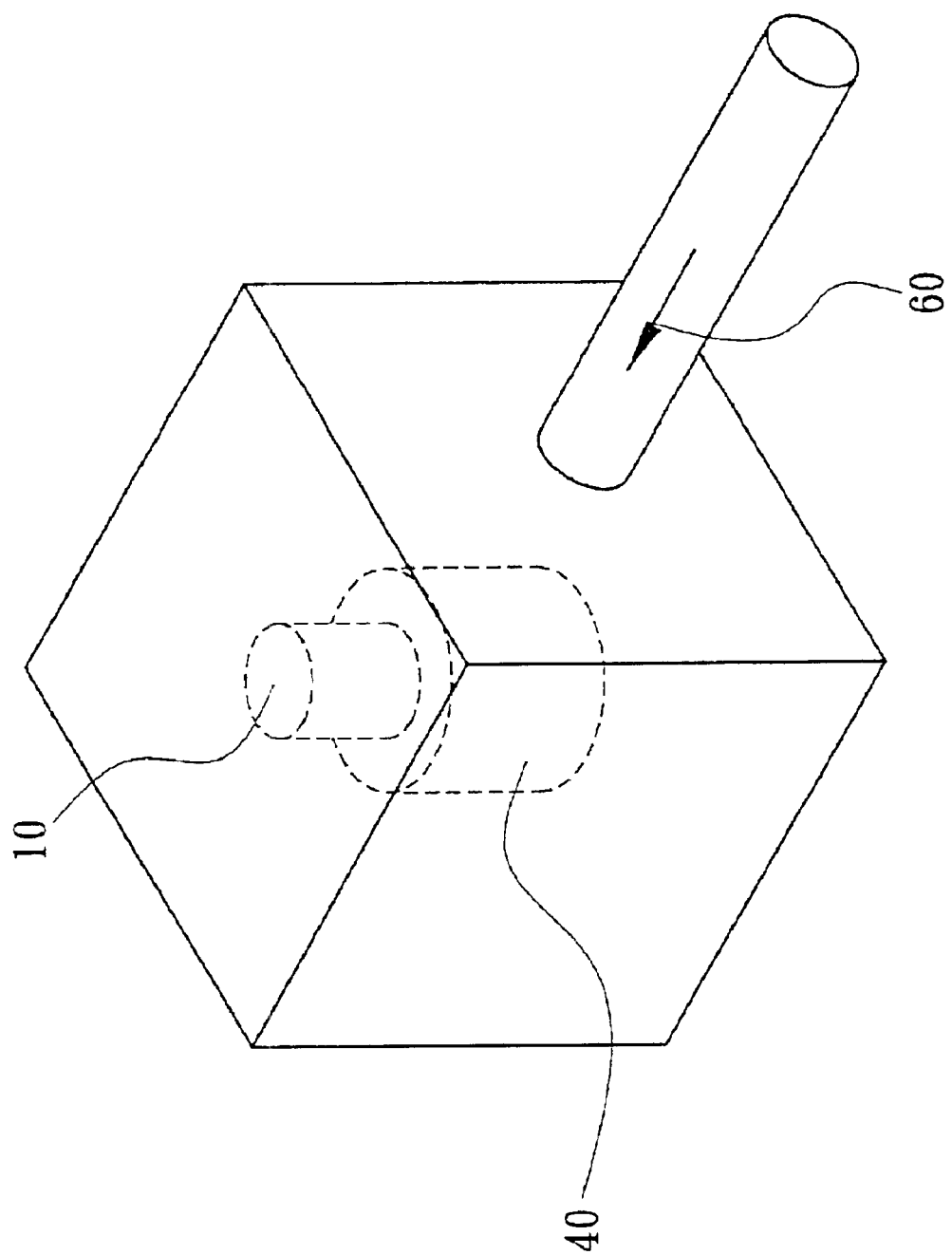
Figure 5G:
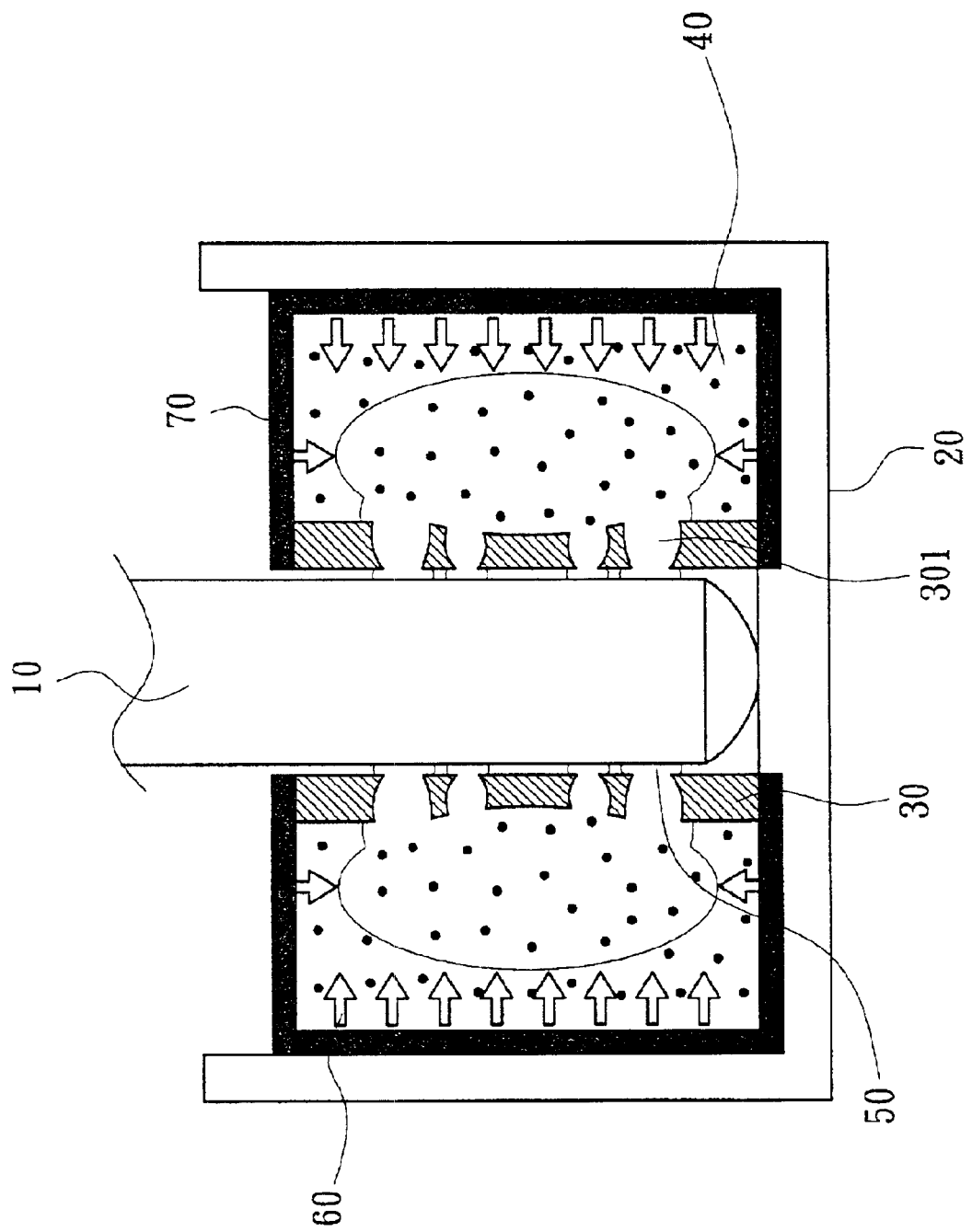

The shaft is installed in the bushing, and then sealed after being pressurized (Step 905), as shown in FIG. 5F and FIG. 5G. As suggested above, pre-pressure can be calculated to achieve an optimum value. The bearing shown in the figure is the bearing connected at the bottom (or top). However, this is not the only case. It can also be installed in the middle of the shaft 10. The difference is that both sides of the housing should then be sealed (not shown in the figures).

The invention relates to a hydrodynamic and hydrostatic hybrid bearing and its manufacturing method. It can achieve the following effects:

1. To improve the processing efficiency of tiny grooves in the inner aperture of a small size hydro bearing.
2. To maintain rigidity and strength of the lubricant between the axis and bearing, and to reduce starting friction.
3. To improve the filling method of the lubricant.
4. To solve the leakage problem of the lubricant.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydrodynamic and hydrostatic hybrid bearing comprises:
   a housing containing a lubricant;
   a bushing placed in the housing having a plurality of dynamic pressure generating openings that penetrate completely through the bushing, said bushing storing the lubricant; and
   a shaft rotatably installed in the bushing;
   wherein the lubricant produces hydrodynamic pressure between the openings and the shaft when the shaft rotates relative to the bushing.

2. The hydrodynamic and hydrostatic hybrid bearing of claim 1, wherein the housing comprises a porous material for storing a lubricant.

3. The hydrodynamic and hydrostatic hybrid bearing of claim 1, wherein a pre-pressure is applied to the housing for making the lubricant pass through the openings and to be present between the bushing and the shaft.

4. The hydrodynamic and hydrostatic hybrid bearing of claim 3, wherein the pre-pressure is applied by an external device after the shaft is in the bushing.

5. The hydrodynamic and hydrostatic hybrid bearing of claim 3, wherein the housing further comprises a sealed unit to maintain the pre-pressure.

6. The hydrodynamic and hydrostatic hybrid bearing of claim 5, wherein the sealed unit comprises a sealing glue.

7. The hydrodynamic and hydrostatic hybrid bearing of claim 1, wherein the bushing is a cylinder-shaped bushing.

8. The hydrodynamic and hydrostatic hybrid bearing of claim 1, wherein the dynamic pressure generating openings are two pairs of herringbone grooves.

9. The manufacturing method of the hydrodynamic and hydrostatic hybrid bearing comprises the following steps:

forming a bushing;

processing a plurality of dynamic pressure generating openings that completely penetrate through the bushing;

integrating the bushing into a housing containing a lubricant;

installing a shaft in the bushing; and applying a pre-pressure to the housing and sealing the housing.

10. The manufacturing method as claim 9, wherein the bushing is a cylinder-shaped bushing.

11. The manufacturing method as claim 9, wherein the dynamic pressure generating openings are processed by a cutting processing.

12. The manufacturing method as claim 9, wherein the dynamic pressure generating openings are formed by an etching process.

13. The manufacturing method as claim 9, wherein the dynamic pressure generating openings are formed by a plastic injection process.

14. The manufacturing method as claim 9, wherein the dynamic pressure generating openings comprise two pairs of herringbone grooves.

15. The manufacturing method as claim 9, wherein lubricant produces a hydrodynamic pressure between the dynamic pressure generating openings and the shaft when the shaft rotates relative to the bushing.

16. The manufacturing method as claim 9, wherein the housing contains porous material for storing the lubricant.

17. The manufacturing method as claim 9, wherein the pre-pressure makes the lubricant pass through the openings and be maintained between the bushing and shaft.

18. The manufacturing method as claim 9, wherein the bushing is combined with the housing by being inserted directly into the housing.

19. The manufacturing method as claim 9, wherein the bushing is combined with the housing by extruding and sintering.

* * * * *